US008704139B2

(12) United States Patent
Luppold et al.

(10) Patent No.: US 8,704,139 B2
(45) Date of Patent: Apr. 22, 2014

(54) ELECTRIC HEATING DEVICE

(75) Inventors: Michael Edgar Luppold, Dettenhelm-Lie (DE); Alexander Dauth, Maulbronn (DE); Juergen Kochems, Illingen (DE); Klaus Lehmann, Oberderdingen (DE); Joerg Weigold, Karlsruhe (DE); Hans-Peter Etzkorn, Bruchsal (DE)

(73) Assignee: BorgWarner BERU Systems GmbH, Ludwigsburg (DE)

( * ) Notice: Subject to any disclaimer, the term of this patent is extended or adjusted under 35 U.S.C. 154(b) by 111 days.

(21) Appl. No.: 13/446,201

(22) Filed: Apr. 13, 2012

(65) Prior Publication Data

US 2012/0261403 A1 Oct. 18, 2012

(30) Foreign Application Priority Data

Apr. 16, 2011 (DE) ......................... 10 2011 017 376

(51) Int. Cl.
*H05B 3/06* (2006.01)
*B60K 1/00* (2006.01)

(52) U.S. Cl.
USPC ........... 219/520; 219/540; 219/202; 219/205; 219/206; 219/530; 219/532; 180/65.1; 180/68.4; 701/22

(58) Field of Classification Search
USPC ......... 219/520, 540, 202, 205–208, 530, 532; 180/65.1, 68.4; 701/22
See application file for complete search history.

(56) References Cited

U.S. PATENT DOCUMENTS 8,314,363 B2 * 11/2012 Doerrie ......................... 219/202

FOREIGN PATENT DOCUMENTS

DE 198 48 169 A1 5/1999
GB 2320166 A 6/1998

* cited by examiner

*Primary Examiner* — Shawntina Fuqua
(74) *Attorney, Agent, or Firm* — Hackler Daghighian & Martino

(57) ABSTRACT

The invention relates to a heating device comprising at least one tube housing in which at least one PTC heating element is arranged, and heat exchangers which are secured on the tube housing. According to the invention, it is provided that the heat exchangers are secured on the tube housing by stamping.

9 Claims, 1 Drawing Sheet

ELECTRIC HEATING DEVICE

The invention is based on an electric heating device known from DE 198 48 169 A1 for heating the interior of motor vehicles.

The heating device known from DE 197 48 169 A1 has three heating rods which are each formed as a tube in which a plurality of PTC elements are arranged. Fins serving as heat exchanger are slid onto the heating rods. The fins made of sheet metal connect the three heating rods to form a compact unit and emit heat generated by the heating elements to an air flow flowing transverse to the longitudinal direction of the tubes.

SUMMARY OF THE INVENTION

It is an object of the present invention to show a way how an electric heating device of the aforementioned type, which is suitable for heating the interior of a motor vehicle, can be manufactured more cost-effectively.

According to the present invention, the heat exchangers are secured on the tube housing by stamping. During stamping, the heat exchangers and/or the tube housing are plastically deformed so that a force- and form-fitting connection between the tube housing and the heat exchangers is established. By stamping, advantageously, a very good thermal coupling between the tube housing and the heat exchangers is achieved. Heat generated by one or a plurality of PTC heating elements of a heating device according to the invention can therefore be emitted very efficiently to an air flow to be heated.

It is in particular advantageous that the heat exchangers can be secured on the tube housing in a single work step. Therefore, a heating device according to the invention can be manufactured significantly more cost-effectively than a conventional heating device where a multiplicity of fins has to be slid individually onto the tube housing.

Manufacturing the heating device according to the invention can be adapted with minor efforts to the requirements of a specific purpose of use, for example to a car manufacturer's specifications with regard to output or flow area. Independent of the quantity of tube housings, their length and the total width of the heating device, it is possible to use always the same parts in order to manufacture a heating device with the desired specifications. Therefore, a heating device according to the invention can advantageously be designed in a modular manner.

The heat exchangers of a heating device according to the invention are preferably formed as extruded profiles, but can also be produced, for example, as a casting. By stamping, a compression of the tube housing and/or the heat exchangers can be achieved which combines a mechanically loadable connection with a good thermal contact.

An advantageous refinement of the invention provides that the tube housing has flanges which extend in the longitudinal direction of the tube housing and in each case cover an edge of one of the heat exchangers. During stamping, the flanges are plastically deformed. For fabricating the heating device, the heat exchangers can be placed on one side face of a tube housing between two flanges. Subsequently, the flanges are pressed and in this manner, the tube housing is stamped to the heat exchangers.

Preferably, the flanges are bent around projections of the heat exchangers. The projection can be formed on an edge of the heat exchanger, for example as a ridge or fin extending in the longitudinal direction of the tube housing. It is in particular advantageous if the heat exchanger rests against the tube housing with a side face which is widened transverse to the longitudinal direction. This results in an embossment on the edge of the heat exchanger's front side which is subjected to the inflow, and on the back side thereof.

BRIEF DESCRIPTION OF THE DRAWINGS

Further details and advantages of the invention are explained by means of an exemplary embodiment with reference to the attached drawings. In the figures.

DETAILED DESCRIPTION

Figure 1:
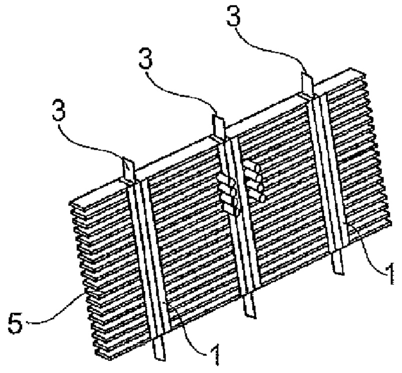
FIG. 1 shows an exemplary embodiment of an electric heating device.

The heating device illustrated in the FIGS. 1 to 4 has a plurality of heating rods which each have a tube housing 1 in which a plurality of PTC heating elements 2 are arranged. The PTC heating elements 2 are electrically contacted with contact plates 3 which protrude from the tube housings 1. On the tube housings 1, heat exchangers 5 are mounted which can be formed as extruded profiles, for example.

The heat exchangers 5 are secured on the tube housings 1 by means of stamping. For this purpose, the tube housings have flanges 1*a* which extend in the longitudinal direction of the tube housing 1 and each cover an edge of one of the heat exchangers 5. During stamping, the flanges 1*a* are plastically deformed so that a force- and form-fitting connection between the heat exchangers 5 and the tube housings 1 is established.

Figure 4:
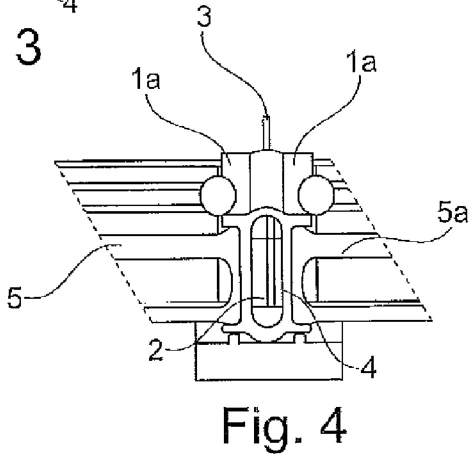
FIG. 4 shows a view according to FIG. 3 with a schematically illustrated tool for stamping.

In the illustrated exemplary embodiment, the flanges 1*a* are formed as extensions of a side wall of the tube housings 1. In this manner, the tube housing 1 forms a receptacle between two adjacent flanges 1*a* in which receptacle, the heat exchangers 5 can be inserted. After inserting the heat exchangers 5, the flanges 1*a* are stamped and plastically deformed as schematically illustrated in FIG. 4. For stamping, a punch 6 or other stamping tool can be used, for example.

Figure 3:
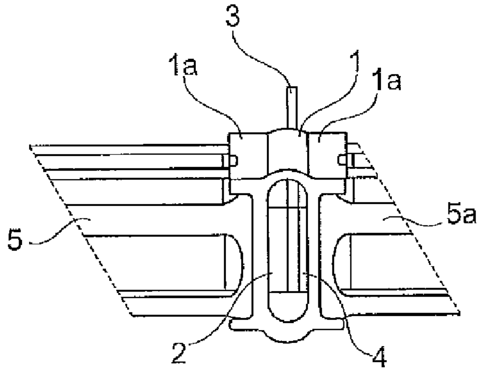
FIG. 3 shows a sectional view of FIG. 2 prior to stamping.

During stamping the flanges 1*a* are bent around the projections 5*a* of the heat exchangers 5. The projections 5*a* are shown in FIG. 3 and can be formed as ridges which extend at the edge of the heat exchangers 5 in the longitudinal direction of the tube housing 1. The heat exchangers 5 rest against the tube housing 1 with a front side which has an increased width, wherein the width is to be measured transverse to the longitudinal direction of the tube housing. The widening of the front sides can form the projections 5*a* around which the flanges 1*a* are engaged.

Figure 2:
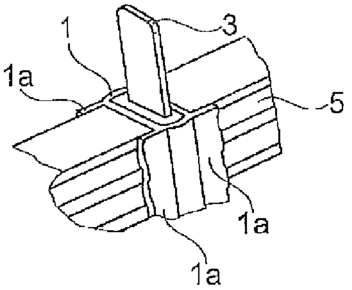
FIG. 2 shows a detailed view of FIG. 1.

As shown in FIG. 2, during stamping, the flanges 1*a* can additionally be pressed into the spaces between adjacent heat exchangers 5 or into depressions of the heat exchangers 5, said depressions running transverse to the longitudinal direction of the tube housing 1.

The tube housings 1 can be formed, for example, as flat tubes as illustrated in particular in the FIGS. 2 to 4. In this case, the heat exchangers rest preferably against the broadsides of the tube housings. Preferably, the narrow sides of the flat tubes are curved, in particular outwardly curved in a convex manner. The flanges 1*a* preferably extend from the narrow sides of the tube housing 1 as shown, for example, in FIG. 3.

After inserting the PCT heating elements 2, the tube housings 1 can be compressed in order to generate a good thermal coupling between the tube walls and the PTC heating elements 2. Thereby, a convex curvature of the narrow sides can be generated or increased. Preferably, after such a pressing, the heat exchangers 5 are attached to the tube housings 1. However, for improving the thermal coupling, it is principally also possible to compress the tube housings 1, while the heat exchangers 5 are secured on the tube housings 1 by stamping. In particular if spring elements, which are arranged in the tube housings 1, effect a good thermal coupling to the tube housing 1 by applying pressure to the PTC heating elements 2, compressing the tube housings can be dispensed with.

The contact plates 3 are electrically insulated with respect to the tube housing 1 by an insulating layer 4. The PTC heating elements 2 can rest with one contact side against a contact plate 3 and with the other contact side against the tube housing 1. This effects a ground contact. However, it is also possible to arrange the PTC heating elements 2 in the tube housings 1 between two contact plates which are in each case electrically insulated with respect to the tube housing 1. The contact plates 3 can carry a non-illustrated frame from plastic which positions the PTC heating elements 2.

The PTC heating elements 2 can be arranged in the tube housing 1 in such a manner that their contact sides, at which they are electrically contacted, face toward the heat exchangers 5, as illustrated in the figures. However, it is also possible to arrange the PTC heating elements 2 in the tube housings 1 in such a manner that the narrow sides of the PTC heating elements 2 face toward the heat exchanger 1. The latter possibility is in particular advantageous if during stamping to the heat exchangers 5, the tube housings 1 are to be pressed at the same in order to achieve through said pressing an improved thermal coupling of the PTC heating elements 2 to the tube housing 1.

REFERENCE LIST

1 Tube housing
1*a* Flanges
2 PTC heating elements
3 Contact plate
4 Insulating layer
5*a* Projections
6 Punch

What is claimed is:

1. A heating device comprising at least one tube housing in which at least one PTC heating element is arranged, and heat exchangers which are secured on the tube housing by stamping wherein the tube housing has flanges which extend in the longitudinal direction of the tube housing and each cover an edge of one of the heat exchangers, wherein the flanges are plastically deformed by the stamping.

2. The heating device according to claim 1, wherein the heat exchangers are extruded profiles.

3. The heating device according to claim 1, wherein the flanges are bent around projections of the heat exchangers.

4. The heating device according to claim 3, wherein the projection is formed as ridge extending in the longitudinal direction of the tube housing.

5. The heating device according to claim 1, wherein the heat exchanger has depressions which run transverse to the longitudinal direction of the tube housing and in which the flanges engage.

6. The heating device according to claim 1, wherein the flanges engage in spaces between adjacent heat exchangers.

7. The heating device according to claim 1, wherein the PTC heating element in the tube housing faces a heat exchanger with the side at which it is electrically contacted.

8. The heating device according to claim 1, wherein the tube housing has two curved side walls which connect two planarly formed side walls against which the heat exchangers rest.

9. The heating device according to claim 8, wherein the curved side walls of the tube housings are curved in a convex manner.

* * * * *